(12) United States Patent
Berne

(10) Patent No.: US 11,548,478 B2
(45) Date of Patent: Jan. 10, 2023

(54) VEHICLE CAMERA SYSTEM COMPRISING AN INTEGRATED LENS CLEANING MECHANISM, VEHICLE COMPRISING SUCH CAMERA SYSTEM AND METHOD

(71) Applicant: Volvo Lastvagnar AB, Gothenburg (SE)

(72) Inventor: Nicolas Berne, Heyrieux (FR)

(73) Assignee: Volvo Lastvagnar AB, Gothenburg (SE)

( * ) Notice: Subject to any disclaimer, the term of this patent is extended or adjusted under 35 U.S.C. 154(b) by 424 days.

(21) Appl. No.: 16/629,206

(22) PCT Filed: Aug. 9, 2017

(86) PCT No.: PCT/EP2017/070232
§ 371 (c)(1),
(2) Date: Jan. 7, 2020

(87) PCT Pub. No.: WO2019/029806
PCT Pub. Date: Feb. 14, 2019

(65) Prior Publication Data
US 2020/0139942 A1    May 7, 2020

(51) Int. Cl.
*B60S 1/50* (2006.01)
*B60R 11/04* (2006.01)
*B60S 1/56* (2006.01)
*G02B 27/00* (2006.01)
*B60R 11/00* (2006.01)

(52) U.S. Cl.
CPC ............... *B60S 1/50* (2013.01); *B60R 11/04* (2013.01); *B60S 1/56* (2013.01); *G02B 27/0006* (2013.01); *B60R 2011/004* (2013.01)

(58) Field of Classification Search
CPC ...... B60S 1/50; B60S 1/56; B60S 1/52; B60R 11/04; B60R 2300/80; B60R 2300/101; B60R 2011/004; G03B 17/56
USPC ........... 359/509; 15/250.01; 134/95.3, 104.2, 134/105, 198, 56 R
See application file for complete search history.

(56) References Cited

U.S. PATENT DOCUMENTS

2012/0117745 A1  5/2012  Hattori et al.
2016/0244028 A1*  8/2016  Wakatsuki ............ B60S 1/566

FOREIGN PATENT DOCUMENTS

DE   102015118670 A1   5/2017
EP     2955065 A1 * 12/2015  ............... B60R 1/00
(Continued)

OTHER PUBLICATIONS

International Search Report and Written Opinion for International Patent Application No. PCT/EP2017/070232, dated Apr. 12, 2018, 8 pages.
(Continued)

*Primary Examiner* — Katina N. Henson
(74) *Attorney, Agent, or Firm* — Withrow & Terranova, PLLC

(57) ABSTRACT

The invention concerns a vehicle camera system (2), comprising a camera (8) comprising a camera lens (80), a movable shutter (10) for protecting the camera lens when the camera is not used, and an integrated lens cleaning mechanism, comprising at least one cleaning liquid nozzle (12) that is part of the shutter (10). The integrated lens cleaning mechanism further includes a collector (14) for collecting used cleaning liquid dripping off the camera lens (80).

8 Claims, 2 Drawing Sheets

(56) References Cited

FOREIGN PATENT DOCUMENTS

Figure 1:
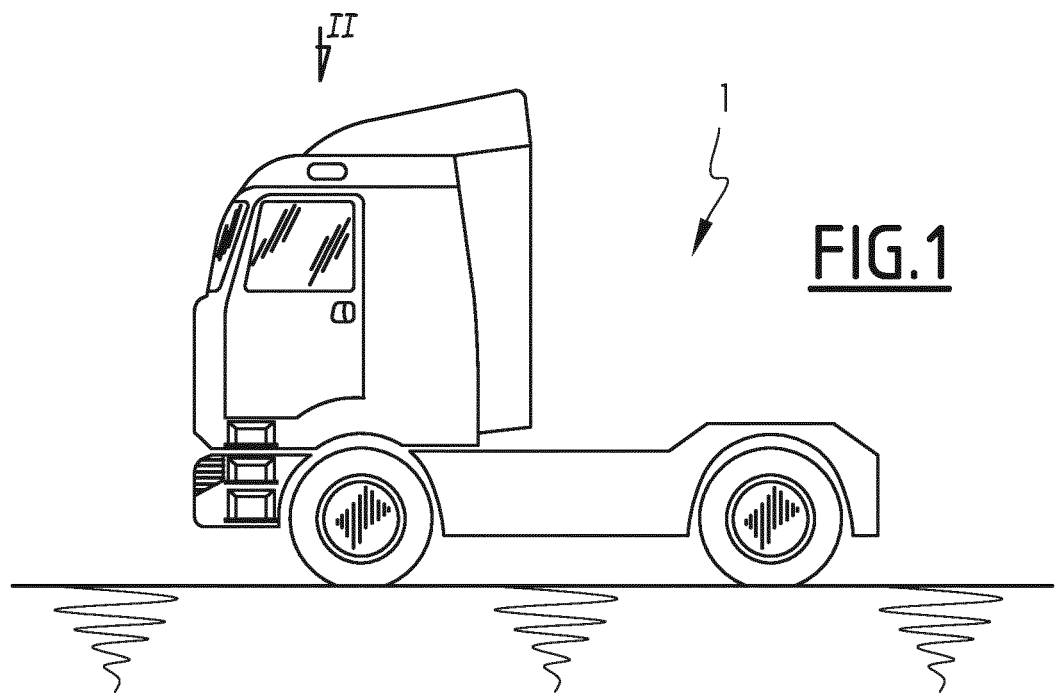

KR          101704047 B4 *   2/2011   ............. B60R 11/04
WO         2016091422 A1    6/2016

OTHER PUBLICATIONS

Examination Report for European Patent Application No. 17754312.1, dated Dec. 15, 2020, 5 pages.

* cited by examiner

VEHICLE CAMERA SYSTEM COMPRISING AN INTEGRATED LENS CLEANING MECHANISM, VEHICLE COMPRISING SUCH CAMERA SYSTEM AND METHOD

This application is a 35 USC 371 national phase filing of International Application No. PCT/EP2017/070232, filed Aug. 9, 2017, the disclosure of which is incorporated herein by reference in its entirety.

The present invention concerns a vehicle camera system.

In the automotive industry, advanced camera solutions provide safety systems such as forward collision warning, following distance indication and lane departure warning. These functions are realized with a forward-looking camera mounted for example below the front windshield of the vehicle. Also, side cameras may be used in the blind spot information systems or in replacement of the outside mirrors. Further, more and more vehicles include a back-up assist system with a rearview camera. Moreover, autonomous vehicles generally include many cameras.

Given the importance of such functions, the cameras must be kept free of soiling in order to provide reliable information. There exist automatic systems for cleaning the camera lens on a regular basis. Such automatic systems include spray nozzle(s) and a cleaning liquid container for supplying the spray nozzle(s). In the specific case of a truck, the container is generally arranged on the lower frame, i.e. at the height of the wheels. Therefore, there is at least one pipe extending from the container arranged on the frame to the nozzles arranged at an upper part of the cabin where are located the cameras. This pipe is routed inside the cabin, sometimes near electrical cables. Accordingly, any leak may have major consequences.

WO 2016/091422 discloses a camera assembly of a motor vehicle, comprising a movable flap equipped with liquid spray nozzles. During cleaning sequences, this movable flap is closed so as to cover the camera lens and the nozzles spray a cleaning liquid, such as water, onto the camera lens. Accordingly, the movable flap protects from splashing the surroundings of the vehicle, and in particular the person(s) standing by the vehicle. However, outside the cleaning sequences, the movable flap remains open, i.e. does not cover the camera lens. One drawback is then that dust can be generated at the surface of the camera lens, for example when the vehicle is parked for a long time.

Also, the camera assembly of WO 2016/091422 is specifically a rearview camera assembly of a light-duty vehicle. During and after cleaning sequences, cleaning liquid is dripping off the camera lens and falls down on the ground. This would be unacceptable if the camera assembly was arranged above the cabin door of a heavy-duty vehicle, such as a truck, because cleaning liquid may drip onto the driver entering or leaving the cabin.

The aim of the present invention is to propose a new vehicle camera system that remedies the abovementioned drawbacks.

To this end, the invention concerns a vehicle camera system according to claim 1.

Thanks to the invention, the cleaning liquid sprayed onto the camera lens is collected and may be recycled. Further, there is no risk of cleaning liquid dripping onto the sides of the vehicle. The camera system is then applicable to any kind of vehicle, i.e. to heavy-duty and light-duty vehicles.

Moreover, the side cameras replacing outside mirrors are provided at the end of a foldable arm. In most of the systems, the nozzles are arranged independently from the foldable arm, meaning that the arm needs to be folded during each cleaning sequence. This is not the case with the vehicle camera system according to the invention, because each spray nozzle is directly integrated to the protective shutter. Accordingly, there is no need to fold the arm during cleaning sequence. One may then envisage cleaning the camera lenses while the vehicle is moving.

Further, the cleaning liquid may be recycled, meaning that there is no evacuation of the cleaning liquid outside the truck, and then no risk of splashing the driver entering (or leaving) the cabin or a person passing by the vehicle.

Further advantageous features of the vehicle camera system are defined in claims 2 to 8.

The invention also concerns a vehicle according to claim 9. Advantageous features of the vehicle are specified in claims 10 to 12.

The invention also relates to a method as defined in claim 13.

Figure 2:
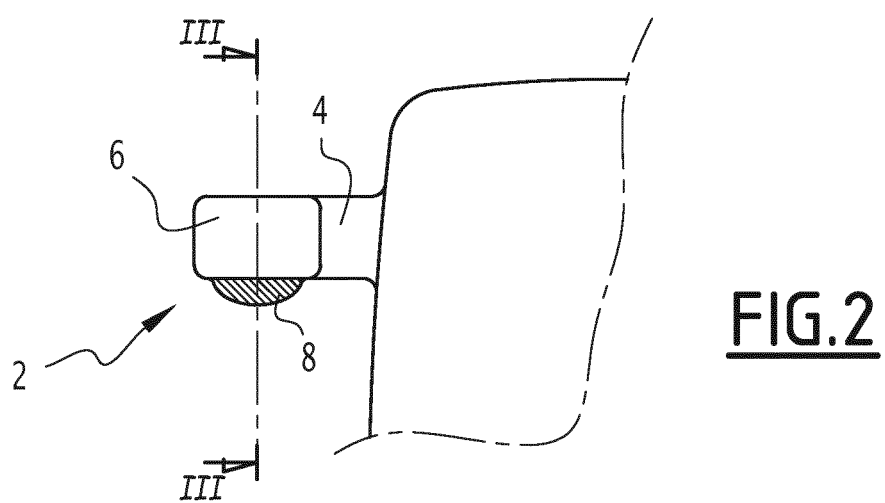
Figure 4:
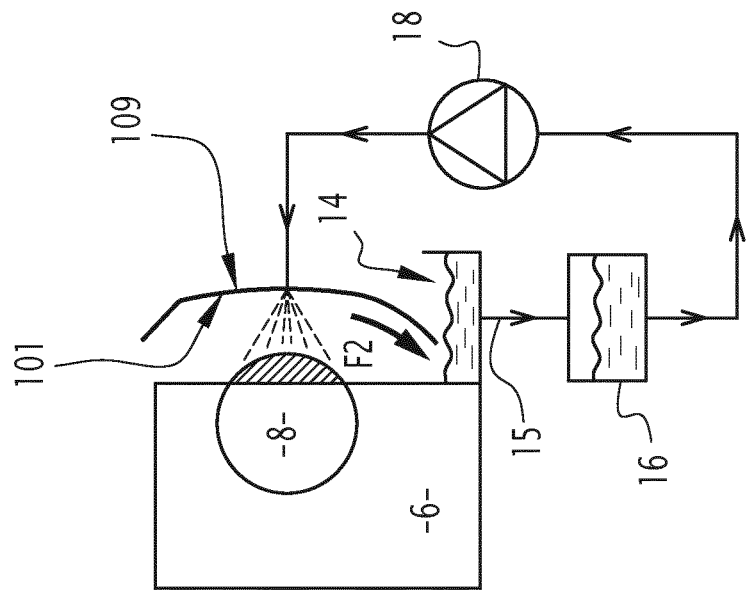
Figure 3:
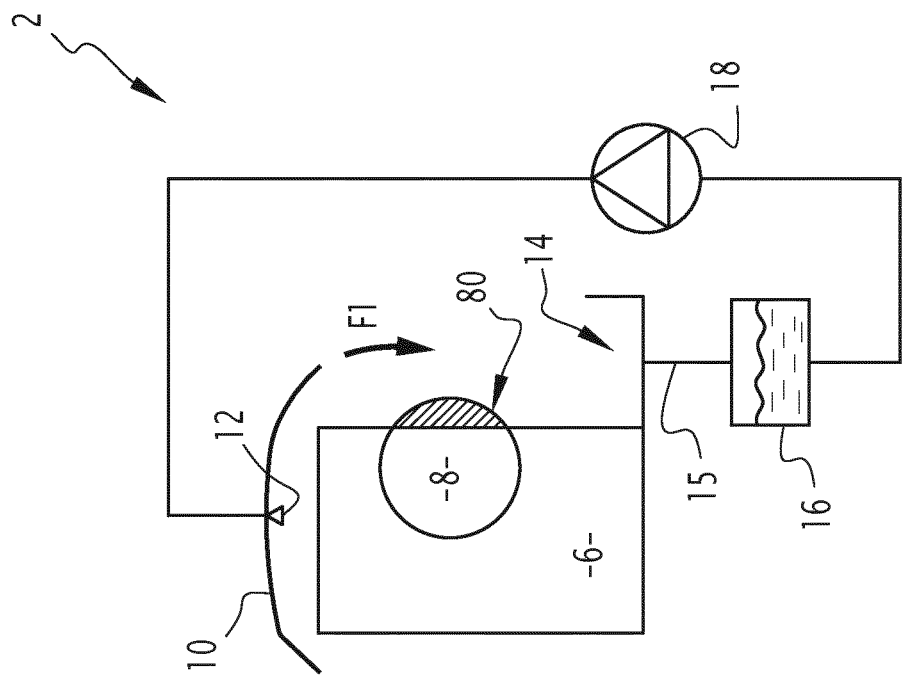

The invention will be better understood from reading the following description, given solely by way of one non-limiting example and with reference to the appended drawings, which are schematic depictions, in which:

FIG. 1 is a side view of a heavy-duty vehicle, in particular a truck, comprising a vehicle camera system according to the invention, FIG. 2 is an enlarged view along arrow II of FIG. 1, FIGS. 3 and 4 are schematic depictions of the vehicle camera system, such vehicle camera system including a movable shutter, that is open in the configuration of FIG. 3 and that is closed in the configuration of FIG. 4.

FIG. 1 represents a vehicle 1 which is, in the example, a heavy-duty vehicle, in particular a truck (towing vehicle). However, the invention is applicable to light-duty vehicles and to any other heavy-duty vehicles, such as buses or construction vehicles.

The vehicle 1 includes a camera system 2, preferably two camera systems 2 replacing outside mirrors. Typically, each camera system 2 is arranged above a cabin door of the heavy-duty vehicle. Each camera system 2 is preferably mounted independently on the vehicle 1, meaning that each camera system 2 may be considered as a spare part.

Advantageously, at least one, preferably two screens (not represented) may be arranged inside the truck cabin to display the images recorded by the two camera systems 2.

Each camera system 2 includes a camera 8 comprising a camera lens 80, a movable shutter 10 for protecting the camera lens 80 when the camera 8 is not used, typically when the vehicle 1 is parked, and an integrated lens cleaning mechanism.

Preferably, the camera 8 is received in a camera housing 6. The camera housing 6 is part of an arm, preferably a foldable arm 4. The arm 4 includes one end designed for being attached to the truck cabin and one free end. Typically, the camera 6 is arranged at the free end of the foldable arm 4.

The foldable arm 4 is in a retracted, or folded position (not represented) when the vehicle is parked and in an extended position, which is the position of FIG. 2, when the vehicle is moving. The foldable arms 4 extend substantially in a perpendicular direction relative to the truck cabin when they are in the extended position. However, in the folded position, represented on FIG. 3, the side cameras 44 are folded against the cabin wall.

Advantageously, the vehicle 1 includes an actuator (not represented) for unfolding the side arms 4 when the vehicle is started and for folding the side arms 4 when the vehicle is parked. Such actuator is well known as such, that is why it is not described in detail. In the example, the truck 2 may be considered as being parked when at least one of the following conditions is fulfilled:
- the driver leaves the cabin;
- the engine is turned off;
- the parking brake is engaged.

Conversely, the vehicle 1 may be considered as being started when at least one of the following conditions is fulfilled:
- the engine is turned on;
- the parking brake is released;
- the driver depresses the throttle;
- a gearbox ratio is engaged;
- the driver depresses the pedal brake.

The shutter 10 includes an internal face 101 and an external face 109. The shutter is movable between an open position, represented on FIG. 3, wherein it does not cover the camera lens 80, and a closed position, represented on FIG. 4, wherein it covers the camera lens 80. In the closed position, the internal face 10a of the shutter 10 faces the camera lens 80. Advantageously, the vehicle 1 includes another actuator (not represented) for moving the shutter from the closed position to the open position when the vehicle is started and for moving the shutter 10 from the open position to the closed position when the vehicle is parked. Such actuator is well known as such, that is why it is not described in detail.

The integrated lens cleaning mechanism comprises at least one cleaning liquid nozzle 12 that is part of the shutter 10, preferably fixedly attached to the shutter 10. In the example, the nozzle 12 is arranged on the internal face of the shutter so as to spray a cleaning liquid in the direction of the camera lens 80 when the shutter is closed. Obviously, the integrated lens cleaning mechanism may comprise a plurality of cleaning liquid nozzles. Thanks to the integration of the nozzle(s) 12 to the movable shutter 10, the camera lens 80 may be cleaned without having to fold the arm 4, as in prior art systems. Accordingly, the arms 4 are not necessary foldable.

Typically, the movable shutter 10 is a hinged element. Alternatively, the movable shutter 10 may be a translatable element.

The integrated lens cleaning mechanism further includes a collector 14 for collecting used cleaning liquid dripping off the camera lens 80. The collector 14 is arranged directly below the camera lens 80.

Advantageously, the vehicle camera system 2 includes a cleaning liquid reservoir 16 and means 15, in particular a pipe, for transferring the cleaning liquid from the collector 14 to the reservoir 16. The cleaning liquid is then recycled, meaning that there is a priori no need to refill the reservoir 16 at short intervals (less maintenance).

Preferably, the vehicle camera system 2 includes a pump 18 for pumping cleaning liquid from the reservoir 16 to the nozzle(s) 12. The pump 18 is optional.

Advantageously, at least the collector 14, the cleaning liquid reservoir 16 or the pump 18 is part of the camera housing 6. Preferably, the collector 14, the cleaning liquid reservoir 16 and the pump 18 are all part of the camera housing 6. This means that the collector 14, the cleaning liquid reservoir 16 and/or the pump 18 are received in a cavity (not represented) of the camera housing 6. Alternatively, this may also mean that the collector 14, the cleaning liquid reservoir 16 and/or the pump 18 are fastened on the outside of the camera housing 6. Alternatively, the collector 14 may be one-piece with the camera housing 6.

Therefore, the cleaning liquid circuit, including all of the components conducting the cleaning liquid, is at least partly integrated to the camera housing 6. One speaks of a miniaturized lens cleaning mechanism (and of a miniaturized reservoir) because the reservoir 16 has a low capacity.

Typically, the capacity of the reservoir 16 is inferior to 300 $cm^3$. In the same manner, the capacity of the pump 18 is inferior to 50 $cm^3/s$.

One important thing is that the cleaning liquid reservoir 16 is not arranged on the lower frame of the vehicle, meaning that there is no pipe extending from the vehicle lower frame to the nozzle 12 (arranged at the vicinity of the camera 6). Accordingly, there is no risk of leakage inside the cabin.

Typically, the shutter 10 is closed when the vehicle is parked, so as to protect the camera lens when the camera is not used. In particular, the shutter 10 prevents the camera lens 80 from gathering external dust when the vehicle is parked, in particular when the vehicle is parked for a long time. Accordingly, the cleaning frequency is less important.

Moreover, the shutter 10 is also closed during cleaning sequences. This means that at the initiation of a cleaning sequence, the shutter 10 is moved from the open position to the closed position, as represented by arrow F1 on FIG. 3.

For example, cleaning sequences may be programmed each time the vehicle is started, i.e. being started and/or each time the vehicle is parked, i.e. being parked. Alternatively, the driver may have the possibility of controlling the activation of the cleaning, for example when the vehicle is stopped at a red light. To this end, specific activation means may be provided inside the cabin.

During each cleaning sequence, cleaning liquid, such as water, is sprayed onto the camera lens 80. The spray of cleaning liquid removes effectively the dust gathered on the camera lens surface. Cleaning liquid dripping off the camera lens during or after the cleaning sequences is collected, as represented by arrow F2 on FIG. 4. The cleaning liquid dripping off the camera lens 80 is collected under gravity in the collector 14. Accordingly, the sprayed cleaning liquid does not fall down on the ground and there is no risk of splashing the driver leaving or entering the cabin.

Afterwards, used cleaning liquid is preferably transferred from the collector 14 to the reservoir 16 by the pipe 15. This means that cleaning liquid is in fact recycled.

In a non-represented alternative embodiment, the camera is a forward-looking camera that may be mounted below the front windshield of the vehicle 1. However, any other emplacement may be suitable. Typically, the camera may be part of a safety system, such as a forward collision warning system, a following distance indication system and/or a lane departure warning system. The camera may also be a rearview camera.

In a non-represented alternative embodiment, the vehicle 1 is an autonomous vehicle.

In another non-represented alternative embodiment, the cleaning system includes a filter, for example arranged between the reservoir 16 and the pump 18. This filter allows filtering out dirt so as to avoid clogging the pump 18. This filter may be removable, so that it can be easily cleaned or replaced.

The features of the described embodiment and of non-represented alternative embodiments may be combined together in order to generate new embodiments of the invention.

The invention claimed is:

1. A vehicle camera system, comprising:
    a camera comprising a camera lens,
    a movable shutter for protecting the camera lens when the camera is not used, an integrated lens cleaning mechanism, comprising at least one cleaning liquid nozzle that is part of the shutter,
a camera housing comprising a collector for collecting used cleaning liquid dripping off the camera lens,
a cleaning liquid reservoir and means for transferring the cleaning liquid from the collector to the reservoir, and
a pump for pumping cleaning liquid from the reservoir to the at least one cleaning liquid nozzle,
wherein the collector, the cleaning liquid reservoir, and the pump are all part of the camera housing.

2. The vehicle camera system of claim 1, wherein the vehicle camera system includes an arm at the end of which the camera housing is arranged.

3. The vehicle camera system of claim 1, wherein the movable shutter is a hinged element or a translatable element.

4. A vehicle comprising the at least one camera system of claim 1.

5. The vehicle of claim 4, wherein the vehicle includes two camera systems replacing outside mirrors.

6. The vehicle of claim 4, wherein the vehicle is a heavy-duty vehicle, such as a truck.

7. The vehicle of claim 6, wherein each camera system is arranged above a cabin door of the heavy-duty vehicle.

8. The vehicle camera system of claim 2, wherein the arm comprises a foldable arm.

\* \* \* \* \*